United States Patent
Yang

(10) Patent No.: US 9,110,215 B2
(45) Date of Patent: Aug. 18, 2015

(54) DISPLAY DEVICE

(71) Applicant: Wen-Pin Yang, Hsin-Chu (TW)

(72) Inventor: Wen-Pin Yang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 143 days.

(21) Appl. No.: 13/902,858

(22) Filed: May 27, 2013

(65) Prior Publication Data

US 2013/0322113 A1 Dec. 5, 2013

(30) Foreign Application Priority Data

May 29, 2012 (TW) .............................. 101210246 U

(51) Int. Cl.
*G02F 1/13357* (2006.01)
*F21V 8/00* (2006.01)
*G02F 1/1333* (2006.01)

(52) U.S. Cl.
CPC .............. *G02B 6/0088* (2013.01); *G02B 6/009* (2013.01); *G02F 2001/133317* (2013.01)

(58) Field of Classification Search
CPC ................. G02F 2001/133317; G02B 6/0088; G02B 6/009
USPC ................... 362/632–634, 612, 617
See application file for complete search history.

(56) References Cited

U.S. PATENT DOCUMENTS

| 7,154,570 B2* | 12/2006 | Lee | 349/58 |
| 2007/0047264 A1* | 3/2007 | Joo et al. | 362/633 |
| 2010/0309405 A1* | 12/2010 | Tajiri | 349/60 |

FOREIGN PATENT DOCUMENTS

| CN | 102354014 | 2/2012 |
| JP | 2009098310 | 5/2009 |
| JP | 2010073506 | 4/2010 |
| TW | 201215959 | 4/2012 |

OTHER PUBLICATIONS

"Office Action of Japan Counterpart Application", issued on May 20, 2014, p. 1-p. 2.

* cited by examiner

*Primary Examiner* — Julie Bannan
(74) *Attorney, Agent, or Firm* — Jianq Chyun IP Office

(57) ABSTRACT

A display device includes a display panel having an active display area, an optical film set, a light source module, and a frame. The light source module includes a light guide plate (LGP) and a light source adjacent to a side surface of the LGP. The optical film set is located between the display panel and the LGP. The frame disposed between the LGP and the optical film set extends to the LGP and covers a portion of the LGP. The frame has a first surface carrying the optical film set, a second surface facing to the light emitting surface, and a chamfered inclined surface. The chamfered inclined surface is within the active display area and connects the first and second surfaces. An extending distance of the first surface in the active display area is smaller than an extending distance of the second surface in the active display area.

6 Claims, 3 Drawing Sheets

DISPLAY DEVICE

CROSS-REFERENCE TO RELATED APPLICATION

This application claims the priority benefit of Taiwan application serial no. 101210246, filed on May 29, 2012. The entirety of the above-mentioned patent application is hereby incorporated by reference herein and made a part of this specification.

BACKGROUND

1. Technical Field

The invention relates to a display device. Particularly, the invention relates to a display device having a light source module.

2. Related Art

Along with quick development of semiconductor industry and related electronics industry, digital devices such as mobile phones, digital cameras, digital video cameras, notebooks, desktop computers, and flat panel televisions, etc. are all developed to be more convenient, multifunctional, and aesthetic. When the above products are used, a display screen is an indispensable interface, and by using the display screen, the user's operation can be more convenient. In recent years, liquid crystal displays (LCDs) have become a main stream in the market. Since the LCD itself does not have a light emitting function, a light source module has to be provided under the LCD to provide a light source, so as to achieve a display function.

Regarding a side type light source module, it generally includes a light guide plate (LGP) and a plurality of light emitting diode (LED) devices located adjacent to a side surface of the LGP. Presently, the LCD is gradually developed to have a design of narrow bezel, and in order to cope with the design requirement of narrow bezel, a light mixing distance provided to the LED devices by the LGP is insufficient, which is easy to cause bright-dark alternated hot spots at a place on the LGP adjacent to the LED devices. In order to mitigate the problem of hot spot, according to a conventional design, a frame in the LCD extends towards an active display area (a total area of a display panel capable of displaying texts, figures, or images), which may shield the LGP to increase the light mixing distance of the LED devices, so as to provide an even light at a light emitting surface of the LGP. However, such design may cause a problem that the light incident to the active display area from the LGP is blocked by the frame, and a dark zone is generated at a border of the active display area.

China Patent No. CN102354014 discloses a backlight module, in which a supporting rib is disposed at a non-light incident side of the LGP, and the display panel supported by the supporting rib is disposed on the LGP. Taiwan Patent No. TW201215959 discloses a side type backlight module, in which a reflection surface of the frame is used to reflect light emitted from the light source to the LGP.

SUMMARY

The invention is directed to a display device, in which a dark zone appeared on a display area is avoided.

Additional aspects and advantages of the invention will be set forth in the description of the techniques disclosed in the present invention.

To achieve one of or all aforementioned and other advantages, an embodiment of the invention provides a display device including a display panel, an optical film set, a light source module, and a frame. The display panel has an active display area. The light source module includes a light guide plate and a light source. The light source is adjacent to a side surface of the light guide plate. The optical film set is located between the display panel and the light guide plate. A light emitting surface of the light guide plate faces to the optical film set. The frame is disposed between the light guide plate and the optical film set and extends to the light guide plate and covers a portion of the light guide plate. The frame has a first surface, a second surface, and a chamfered inclined surface. The first surface carries the optical film set. The second surface faces to the light emitting surface. The chamfered inclined surface is located within the active display area and is connected to the first surface and the second surface. An extending distance of the first surface in the active display area is smaller than an extending distance of the second surface in the active display area.

In an embodiment of the invention, the display device further includes a casing, where the display panel and the optical film set are confined between the first surface of the frame and the casing, and the light guide plate is confined between the second surface of the frame and the casing.

In an embodiment of the invention, the optical film set has a third surface, the third surface faces to the display panel, and an extending direction of the chamfered inclined surface passes through an orthogonal projection of a border of the active display area on the third surface.

In an embodiment of the invention, the frame has a reflection layer on the chamfered inclined surface.

In an embodiment of the invention, a material of the frame includes a transparent material.

In an embodiment of the invention, a gap is exist between the light emitting surface and the optical film set.

In an embodiment of the invention, the casing includes an outer frame, the outer frame includes a border frame portion, the border frame portion covers a portion of the display panel, where the frame extends from the outer frame towards the active display area and extends outside from the border frame portion.

According to the above descriptions, the frame extends to the light guide plate and covers a portion of the light guide plate, which shields hot spots appeared on the light guide plate adjacent to the LED devices, and increases a light mixing distance of the light source, such that the light emitting surface of the light guide plate presents an even light. In order to avoid a situation that the frame extended to the active display area influences a light emitting area of the light source module or produces a dark zone at a border portion of the active display area, and in order to avoid the user viewing the frame extended to the active display area through the optical film set, a chamfered inclined surface is formed on the frame so that an extending distance of the first surface of the frame that carries the optical film set within the active display area is smaller than an extending distance of the second surface of the frame that faces to the light emitting surface of the light guide plate within the active display area, and the light emitted from the light source could reach the border portion of the active display area from the light emitting surface of the light guide plate. In this way, the light emitting area of the light source module is not limited by the frame, and the border portion of the active display area is not easy to produce the dark zone, which improves display quality of the display device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
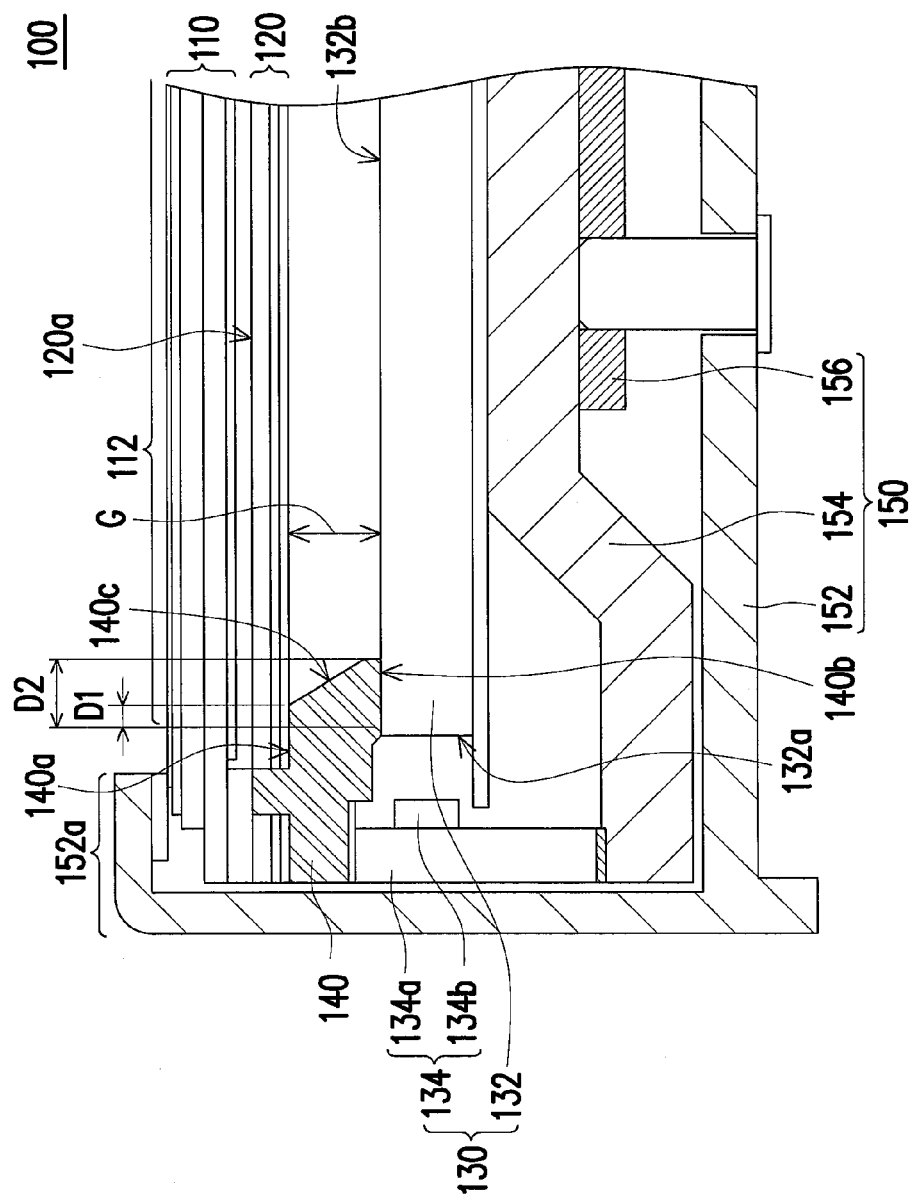
FIG. 1 is a partial cross-sectional view of a display device according to an embodiment of the invention.

Referring to FIG. 1, the display device 100 of the embodiment includes a display panel 110, an optical film set 120, a light source module 130, a frame 140, and a casing 150. The display panel 110 has an active display area 112. The light source module 130 includes a light guide plate (LGP) 132 and a light source 134. The light source 134 is adjacent to a side surface 132a of the LGP 132. The optical film set 120 is located between the display panel 110 and the LGP 132. A light emitting surface 132b of the LGP 132 faces to the optical film set 120. The display device 100 of the embodiment is, for example, a liquid crystal television, a liquid crystal screen, or a display device of the other type, which is not limited by the invention.

The frame 140 is disposed between the LGP 132 and the optical film set 120, such that the display panel 110 and the optical film set 120 are fixed or confined (limited) between a first surface 140a of the frame 140 and the casing 150, and the LGP 132 is fixed or confined (limited) between a second surface 140b of the frame 140 and the casing 150. In detail, the casing 150 of the embodiment may include an outer frame 152, a heat sink 154, and a back plate 156, the display panel 110 and the optical film set 120 are fixed or confined (limited) between the first surface 140a of the frame 140 and the outer frame 152, and the LGP 132 is fixed or confined (limited) between the second surface 140b of the frame 140 and the heat sink 154. The outer frame 152 includes a border frame portion 152a, the border frame portion 152a covers a portion of the display panel 110. In detail, the border frame portion 152a covers a portion of the display panel 110 other than the active display area 112, though the invention is not limited thereto, and in other embodiments, the casing 150 could be a casing of other suitable type.

The first surface 140a of the frame 140 carries the optical film set 120, and the second surface 140b of the frame 140 faces to the light emitting surface 132b of the LGP 132. The frame 140 extends to the LGP 132 and covers a portion of the LGP 132 close to the light source 134, and the frame 140 has a chamfered inclined surface 140c. The chamfered inclined surface 140c is located within the active display area 112 and is connected to the first surface 140a and the second surface 140b of the frame 140. As shown in FIG. 1, a junction of the chamfered inclined surface 140c and the second surface 140b may have a chamfer, though the invention is not limited thereto, and in other embodiments, the junction of the chamfered inclined surface 140c and the second surface 140b does not have the chamfer. An extending distance D1 of the first surface 140a in the active display area 112 is smaller than an extending distance D2 of the second surface 140b in the active display area 112. In an embodiment, the border frame portion 152a covers a portion of the frame 140, and the frame 140 extends outside the border frame portion 152a and towards the active display area 112, as that shown in FIG. 1. Moreover, the side surface 132a of the LGP 132 could be located within or out of the active display area 112, which is not limited by the invention.

Since the frame 140 extends to the LGP 132 and covers a portion of the LGP 132, a light mixing distance could be elongated by shielding the LGP 132 through the frame 140, and the light emitting surface 132b of the LGP 132 may present an even light. In case that the light mixing distance of the light source provided by the LGP is insufficient due to a narrow bezel design of the display device, the aforementioned method could effectively resolve the problem of insufficient light mixing distance.

In the embodiment, since the frame 140 is located between the LGP 132 and the optical film set 120, a gap G is exist between the light emitting surface 132b of the LGP 132 and the optical film set 120. Therefore, before the light emitted from the light source 134 reaches the optical film set 120, the light could be sufficiently mixed within the gap G, so as to improve evenness of the emitted light. In order to avoid a situation that the frame 140 extended to the active display area 112 influences a light emitting area of the light source module 130, and in order to avoid the user viewing the frame 140 extended to the active display area 112 through the optical film set 120 or in order to avoid producing a dark zone at a border portion of the active display area 112, the chamfered inclined surface 140c is formed on the frame 140, and the extending distance D1 of the first surface 140a of the frame 140 that carries the optical film set 120 within the active display area 112 is smaller than the extending distance D2 of the second surface 140b of the frame 140 that faces to the light emitting surface 132b of the LGP 132 within the active display area 112, so that the light emitted from the light source 134 could reach the border portion of the active display area 112 from the light emitting surface 132b of the LGP 132, and the user is not easy to view the frame 140 through the optical film set 120. In this way, the light emitting area of the light source module 130 is not limited by the frame 140, and it is not easy to produce a dark zone at the border portion of the active display area 112, by which the display quality of the display device 100 is improved.

Figure 2:
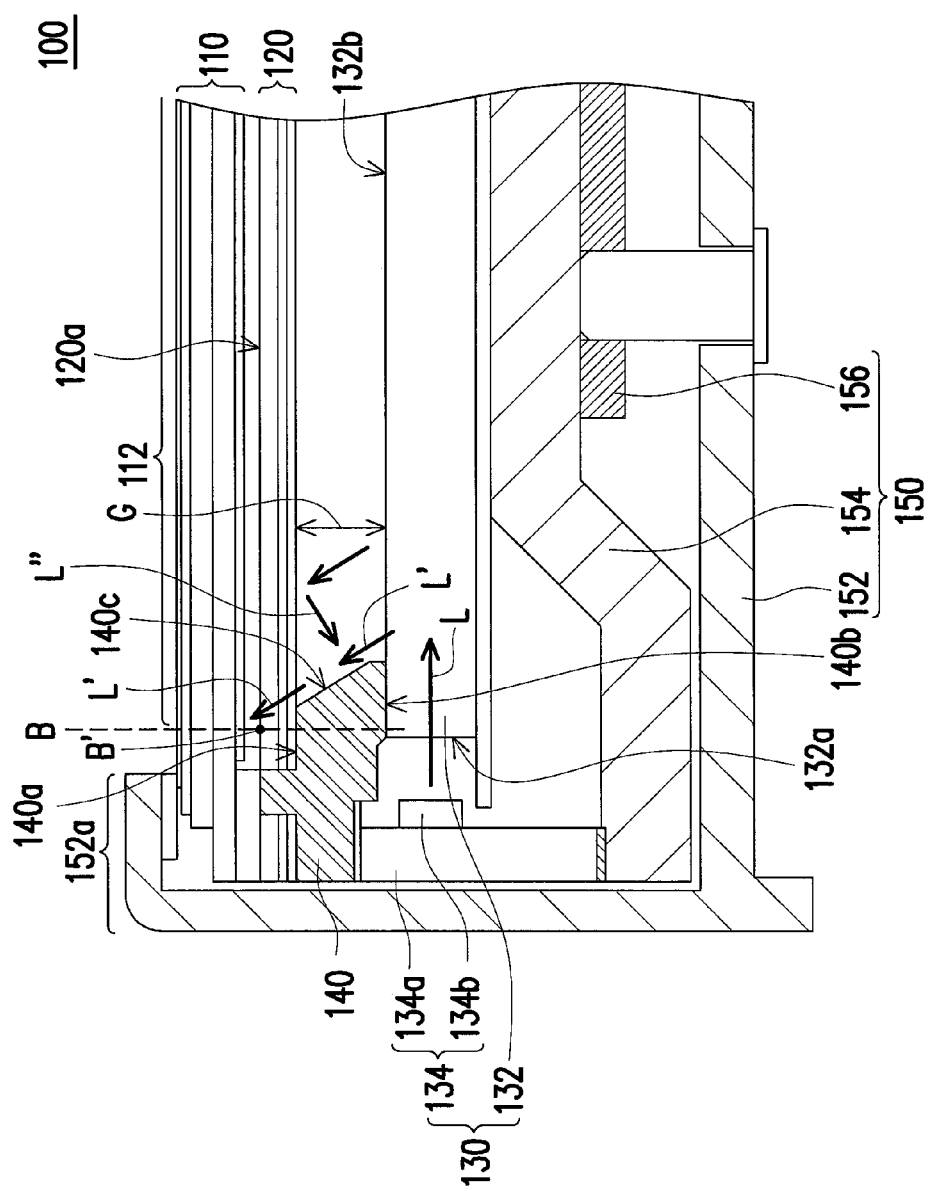
FIG. 2 is a schematic diagram of the display device of FIG. 1 when a light source emits light.

Referring to FIG. 2, the light source 134 is, for example, a light emitting diode (LED) module, which includes a substrate 134a and an LED device 134b. The LED device 134b is disposed on the substrate 134a and is capable of emitting light L. The light L enters the LGP 132 through the side surface 132a of the LGP 132, and emits from the light emitting surface 132b of the LGP 132 to irradiate the optical film set 120 and the display panel 110, so as to provide light required when the display panel 110 displays images. Since the frame 140 has the chamfered inclined surface 140c, and the extending distance D1 (shown in FIG. 1) of the first surface 140a in the active display area 112 is smaller than the extending distance D2 (shown in FIG. 1) of the second surface 140b in the active display area 112, the light (for example, the light with a reference numeral of L') emitted from the light emitting surface 132b of the LGP 132 could irradiate the border portion (i.e. a position where a border B locates) of the active display area 112 along the chamfered inclined surface 140c.

In another embodiment of the invention, the optical film set 120 has a third surface 120a, and the third surface 120a faces to the display panel 110. An extending direction of the chamfered inclined surface 140c passes through an orthogonal projection B' of the border B of the active display area 112 on the third surface 120a. In this way, the extending distance D1 of the first surface 140a in the active display area 112 ensures that the light emitted from the light emitting surface 132b of the LGP 132 irradiates the border portion of the active display area 112. In other embodiments, the chamfered inclined surface 140c could be designed to other suitable angles and positions, which is not limited by the invention. Moreover, a material of the frame 140 of the embodiment is, for example, a transparent material, such that at least a part of the light emitted from the light source 134 could penetrate through the frame 140, which improves the light emitting efficiency and light emitting area of the light source module 130. In other embodiments, the material of the frame 140 could be an opaque material or a semi-transparent material, which is not limited by the invention.

Figure 3:
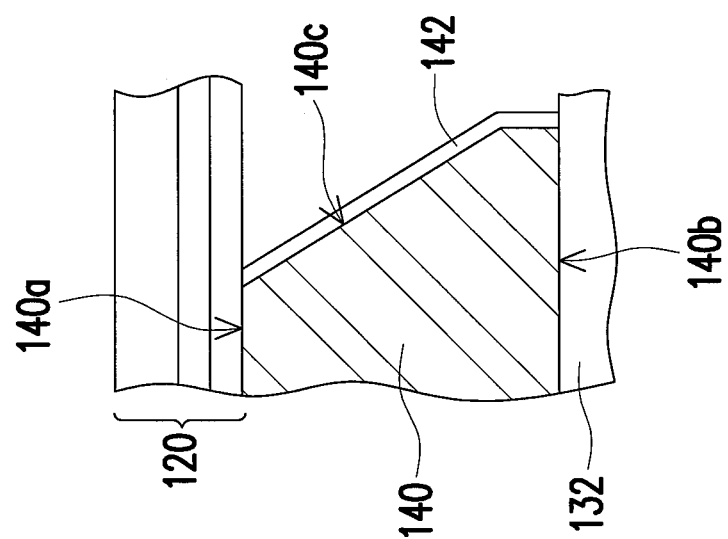
FIG. 3 is a partial enlarged view of the display device of FIG. 1.

Referring to FIG. 2 and FIG. 3, in another embodiment, a reflection layer 142 could be coated on the chamfered inclined surface 140c of the frame 140. The light irradiated onto the chamfered inclined surface 140c (for example, the light with a reference numeral of L") could be reflected by the reflection layer 142 to propagate towards the optical film set 120 and the display panel 110, so as to improve the light emitting efficiency of the light source module 130. In other embodiment, the reflection layer could be omitted, which is not limited by the invention.

In summary, in the aforementioned embodiment of the invention, the frame extends to the LGP and covers a portion of the LGP, which shields hot spots appeared on the LGP adjacent to the LED devices, and increases a light mixing distance of the light source, such that the light emitting surface of the LGP presents an even light. In order to avoid a situation that the frame extended to the active display area influences a light emitting area of the light source module or produces a dark zone at a border portion of the active display area, and in order to avoid the user viewing the frame extended to the active display area through the optical film set, a chamfered inclined surface is formed on the frame so that an extending distance of the first surface of the frame that carries the optical film set within the active display area is smaller than an extending distance of the second surface of the frame that faces to the light emitting surface of the LGP within the active display area, and the light emitted from the light source could reach the border portion of the active display area from the light emitting surface of the LGP. In this way, the light emitting area of the light source module is not limited by the frame, and the border portion of the active display area is not easy to produce the dark zone, which improves display quality of the display device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
 a display panel, having an active display area;
 an optical film set;

a light source module, comprising a light guide plate and a light source, wherein the light source is adjacent to a side surface of the light guide plate, the optical film set is located between the display panel and the light guide plate, and a light emitting surface of the light guide plate faces to the optical film set; and a frame, disposed between the light guide plate and the optical film set, and extending to the light guide plate and covering a portion of the light guide plate, wherein the frame has a first surface, a second surface, and a chamfered inclined surface, the first surface carries the optical film set, the second surface faces to the light emitting surface, the chamfered inclined surface is located within the active display area and is connected to the first surface and the second surface, and an extending distance of the first surface in the active display area is smaller than an extending distance of the second surface in the active display area, the optical film set has a third surface, the third surface faces to the display panel, and an extending direction of the chamfered inclined surface passes through an orthogonal projection of a border of the active display area on the third surface.

2. The display device as claimed in claim 1, further comprising a casing, wherein the display panel and the optical film set are confined between the first surface of the frame and the casing, and the light guide plate is confined between the second surface of the frame and the casing.

3. The display device as claimed in claim 1, wherein the frame has a reflection layer on the chamfered inclined surface.

4. The display device as claimed in claim 1, wherein a material of the frame comprises a transparent material.

5. The display device as claimed in claim 1, wherein a gap exists between the light emitting surface and the optical film set.

6. The display device as claimed in claim 2, wherein the casing comprises an outer frame, the outer frame comprises a border frame portion, and the border frame portion covers a portion of the display panel, wherein the border frame portion covers a portion of the frame, and the frame extends outside the border frame portion and towards the active display area.

* * * * *